United States Patent Office 3,197,374
Patented July 27, 1965

3,197,374
PROCESS FOR THE DISAGGREGATION AND PURIFICATION OF VIRUSES
Walter Hennessen, Marburg an der Lahn, and Heinz Restle, Marbach, near Marburg an der Lahn, Germany, assignors to Behringwerke Aktiengesellschaft, Marburg an der Lahn, Germany, a corporation of Germany
No Drawing. Filed Oct. 11, 1962, Ser. No. 230,007
Claims priority, application Germany, Oct. 14, 1961,
B 64,383
2 Claims. (Cl. 167—78)

It is known that especially in concentrated suspensions or in suspensions which contain ballast substances such as lipoids, proteins, and nucleic acids, the viruses sometimes cluster together in forming aggregations of varying size. These aggregations enclose in their interior single viruses and prevent these from being assayed so that the virus content found is often much lower than the factual one. This may be of decisive importance in the preparation of so-called live virus vaccines. In the preparation of so-called killed-virus vaccines, it may occur that during inactivation of the viruses only those at the surface of the aggregations react, whereas the viruses within the aggregations remain unaffected by the inactivating agent. To remedy this drawback and to remove the virus aggregations, an intermediate filtration during the inactivation with formaldehyde or with a similar agent has heretofore been used. But this intermediate filtration involved considerable losses of virus. In addition, aggregations of viruses of smaller size passed through the filter and represented a considerable hazard if they contained infectious viruses in their interior to which the inactivating agent had had no access.

For disrupting such virus aggregations into single viruses, i.e., for disaggregating them, no practicable process has heretofore been known. Attempts have been made to treat viruses in this respect by column chromatography, for example, by adsorption on calcium phosphate and elution in using a concentration gradient, as described in J. General Microbiology 19 (3), 1958, pages 451–461, but such treatment resulted in a purification only. According to this method, the volume of viruses was approximately equal to the volume of calcium phosphate in the column. A disaggregation of the clustered viruses and a resultant increase in infectiousness was not achieved.

Now, we have found a process which permits disaggregation and purification of viruses in suspension by means of column chromatography, wherein the virus suspension is subjected to chromatography, at a flow rate of 0.001 to 0.400 cc. per min. per cm.$^2$, in a calcium phosphate adsorption column filled at a low pressure of 500–600 mm. Hg with a suspension of $CaHPO_4 \cdot 2H_2O$ in 0.001 M phosphate buffer having a pH-value of 6.5–7.5, the ratio of the diameter of the column to its length being 1:10–1:20. The virus suspension is adjusted to a concentration of about 4000 to 6000 $\gamma$N per cc. of the $CaHPO_4$ suspension used for filling the column. The column is after-washed with a 0.001 M phosphate buffer having a pH-value of 6.5–7.5. The adsorbed viruses are eluted at a speed of flow of 0.001–0.400 cc. per min. per cm.$^2$ with a phosphate buffer having a pH-value of 6.5–7.5 and a constant molarity of from 0.1–1.0 M. If required, the eluate is subsequently purified by passage through a column filled with an ion exchange adsorbing agent, preferably ECTEOLA-cellulose [ECTEOLA=abbreviation for the reaction product of epichlorhydrin, cellulose alkali, triethanolamine (cf. Peterson and Sober, J. Am. Chem. Soc. 78, page 751 (1956))].

It was found that portions of a virus suspension treated in accordance with the process of the present invention by passage through a $CaHPO_4 \cdot 2H_2O$ filled column showed a titer of infectiousness up to 10 times as high as that of the original virus suspension. It was also found, and this was surprising, that such a virus suspension could be purified without further treatment, by means of ion exchange adsorbing agents, for example, ECTEOLA cellulose. The conventional processes for purifying, for example, poliomyelitis viruses through ECTEOLA cellulose required, as preliminary purification, three low-speed centrifugations (2000–3000 rev./min.) and two high-speed centrifugation (30,000–40,000 revolutions). For the production of large amounts of purified, sterile poliomyelitis vaccine, this method of operation was too complicated, involved too high a loss and was also unsuitable for reasons of sterility. In contradistinction thereto, the process of the present invention provides the advantage that all operations, viz. the disaggregation, i.e., the increase in infectiousness, and the purification by passage through the ECTEOLA column, can be effected continuously in a closed, sterile system.

The process of the present invention is applicable to all viruses that form aggregations, for example, poliomyelitis viruses of all three types, which are enteroviruses, as well as to influenza viruses of any type, which are myxo-viruses. Preferably preconcentrated virus suspensions are used in this process.

The following examples illustrate the invention, but they are not intended to limit it thereto:

*Example 1.—Disaggregation of poliomyelitis viruses type I/Mahoney*

10 liters of a suspension of poliomyelitis viruses of type I/Mahoney in a TCM 199/Hanks solution (1:3) having a titer of $10^{+7.0}$ $ID_{50}$/cc., were passed through a glass column (diameter 2 cm., length 30 cm.), filled bubble-free at a low pressure of 500 mm. Hg with a suspension of $CaHPO_4 \cdot 2H_2O$ in 0.001 M phosphate buffer having a pH-value of 6.9, prepared in known manner.

In order to establish a relative measure, it was assumed that an $ID_{50}$/cc. constituted a particle of an infectious virus; thus, 10 liters of the virus suspension contained $10,000 \cdot 10^7 = 10^{11}$ virus particles.

After the virus suspension had passed, the column was washed with 1000 cc. of 0.001 M phosphate buffer having a pH-value of 6.9. The adsorbed virus was then eluated with 2000 cc. of 1 M phosphate buffer having a pH-value of 7. All the solutions passed the column with a speed of 0.2 cc./min./cm.$^2$.

Several titer determinations showed the eluate to have an average content of $10^{12}$ virus particles in 2000 cc. of eluate; the $ID_{50}$/cc. was thus increased by the treatment according to the invention from $10^{+7.0}$ to $10^{+8.0}$ and amounted to $10^{+8.7}$ $ID_{50}$/cc., when taking into consideration the concentration factor (1:5). The purification factor in the adsorption of viruses on $CaHPO_4 \cdot 2H_2O$ amounted to 1:25, referred to the total nitrogen, the purification factor of the higher molecular substances in the eluation amounted to 1:1.2 and the increment of infectiosity to 1000%. The antigenicity of a vaccine, prepared from a suspension of poliomyelitis viruses treated as above, proven by the "extinction limit titer test" conventionally used for testing poliomyelitis viruses, was found to have increased as follows:

|   | Virus concentration | Extinction limit titer |
|---|---|---|
| (1) Starting material | $10^{+7.0}$ $ID_{50}$/cc. | 0.6 |
| (2) After disaggregation | $10^{+8.0}$ $ID_{50}$/cc. | 1.609 |
| (3) After volume reduction | $10^{+8.7}$ $ID_{50}$/cc. | 2.476 |

Example 2

The phosphate buffer content of a virus suspension having a titer of $10^{8.7}$, disaggregated and purified as described in Example 1, was reduced to 0.02 M by known sterile methods, i.e., by dialysis or ultrafiltration; the virus suspension was then passed through a column filled bubble-free under a pressure of 0.1 atmosphere gauge pressure with ECTEOLA cellulose.

The values taken after each of the individual process steps, that were carried out under sterile conditions, are compiled in the following table.

|  | Starting material | Example 1 after CaHPO$_4$ | Example 2 after ECTEOLA |
|---|---|---|---|
|  | 10,000 cc. | 2,000 cc. | 2,000 cc. |
| Infectiosity ID$_{50}$/cc | $10^{7.0}$ | $10^{8.7}$ | $10^{8.7}$ |
| Increase in infectiosity, percent | (100) | 1,000 | -------- |
| Disaggregation factor | (1) | 10 | -------- |
| Total N/mg | 440 | 17.6 | 5.8 |
| N γ/cc | 44 | 8.8 | 2.9 |
| ID$_{50}$/γ N×$10^6$ | 0.229 | 58 | 174 |
| Purification factor | 1 | 1:25 | 1:75 |
| Purification in percent | 0 | 96 | 98.7 |

*Example 3.—Disaggregation of influenza viruses/strain Asia*

250 cc. of influenza infected allantoic liquid whose coarser egg particles had been removed by a short centrifugation at 2000 rev./min. were passed through the adsorption column described in Example 1. 250 cc. of allantoic liquid contain 2560 hemagglutination units per cc. (ha units/cc.), i.e., 250 cc. contain 640,000 ha units.

After having washed the column with 250 cc. of 0.001 M phosphate buffer having a pH-value of 6.9, the adsorbed influenza virus was eluated by means of 250 cc. of 1 M phosphate buffer having a pH-value of 6.9. During all operations the speed of flow was 0.1 cc./min./cm.$^2$.

The eluate was found to contain 1,331,000 ha units, i.e., an additional virus content of 108%, thus a total of 208%. The purification factor was 1:29, i.e., 96.5%, referred to the total nitrogen.

We claim:
1. In a process for the purification of a suspension of a virus selected from the group consisting of poliomyelitis virus and influenza virus by chromatography with a calcium phosphate adsorption column, the improvement whereby virus aggregates in said virus suspension are disaggregated which comprises passing said suspension at a rate of flow of 0.001 to 0.4 cubic centimeters per minute per square centimeter through a calcium phosphate adsorption column filled at a pressure of 500 to 600 millimeters Hg with a suspension of CaHPO$_4$·2H$_2$O in 0.001 Molar phosphate buffer having a pH of 6.5 to 7.5, the ratio of the diameter of the column to its length being about 1:10 to 1:20 and said virus suspension being adjusted to a concentration of about 4000 to 6000 γN per cubic centimeter of said CaHPO$_4$ suspension, subsequently washing said column with a 0.001 Molar phosphate buffer having a pH of 6.5 to 7.5, and then eluting the adsorbed virus at a rate of flow of 0.001 to 0.400 cubic centimeter per minute per square centimeter with a phosphate buffer having a pH of 6.5 to 7.5 and a constant molarity between 0.1 and 1.0 Molar.

2. The process as in claim 1 wherein the eluate obtained is passed through a column filled with ECTEOLA celluose.

References Cited by the Examiner

Ada et al., "Purification of Murray Valley Encephalitis Virus," J. Gen. Microbiol., 24, pp. 177–186 (Feb. 1961).

Brown, "Selective Viral and Serum Antibody Absorption by a Chromatographic Column," Science 133 (3449), pp. 331–332, Feb. 3, 1961.

Cooper, "A Chemical Basis for the Classification of Animal Viruses," Nature, 190, pp. 302–5, April 22, 1961.

Creaser et al., "The Purification and Chromatography of Bacteriophages on Anion-Exchange Cellulose," Virology, 4 (2), pp. 200–208 (1957).

Gordon-Smith et al., "Chromatography of Arthropod-Borne Viruses on Calcium Phosphate Columns," Bull. W.H.O. 24, pp. 749–759 (1961).

Hoyer et al., "Mammalian Viruses and Rickettsia—Their Purification and Recovery by Cellulose Anion Exchange Columns," Science, 127 (3303), pp. 859–863 (1958).

Levin, "Column Chromatography of Proteins: Calcium Phosphate," in Colowick et al., "Methods in Enzymology," vol. V, pp. 27–32, Academic Press, N.Y., 1962.

Reda et al., "Purification of Newcastle Disease Virus by Absorption Chromatography," Zentbl. F. Vetmed. (2), pp. 158–164, Mar. 1962 (Ger.).

Robinson et al., "Chromatography of Coliphages T$_1$ and T$_2$ on Columns of Calcium Phosphate," Canad. Jour. Microbiol., 6 (5), pp. 565–572 (1960).

Simon, "Chromatography of Adenoviruses on Calcium Phosphate," Acta. Virol. (Praha) 6, pp. 302–8, July 1962.

Taverne et al. (I), "The Purification and Concentration of Viruses and Virus-Soluble Antigens on Calcium Phosphate," J. Gen. Microbiol. 19 (3), pp. 451–461 (1958).

Taverne et al. (II), "Purification of Herpes Simplex Virus by Chromatography on Calcium Phosphate," Nature, 184 (suppl. #21), pp. 1655–6 (159).

Tiselius et al., "Protein Chromatography on Calcium Phosphate Columns," Arch. Biochem. and Biophys. 65 (1), pp. 132–155 (1956).

Von Tavel, "Purification of Tobacco Mosaic Virus by Chromatography," Arch. Biochem. Biophys. 85 (2), pp. 491–8 (1959).

LEWIS GOTTS, *Primary Examiner.*